United States Patent Office 3,741,936
Patented June 26, 1973

3,741,936
THERMOPLASTIC MOLDING COMPOSITIONS BASED ON SATURATED POLYESTERS
Walter Herwig, Frankfurt am Main, and Rudolf Uebe and Gunter Freund, Hofheim, Taunus, Germany, assignors to Farbwerke Hoechst Aktiengesellschaft vormals Meister Lucius & Bruning, Frankfurt am Main, Germany
No Drawing. Continuation of abandoned application Ser. No. 51,742, July 1, 1970. This application Jan. 6, 1972, Ser. No. 215,934
Claims priority, application Germany, July 4, 1969, P 19 33 969.6
Int. Cl. C08g 39/04
U.S. Cl. 260—75 S   9 Claims

ABSTRACT OF THE DISCLOSURE

The present invenition provides a molding composition which comprises a linear saturated polyester, an inorganic solid material having a particle size of less than 5 microns and an alkali metal paraffin sulfonate or an alkali metal olefin sulfonate containing 8 to 30 carbon atoms, which molding composition can be worked up in the thermoplastic range and from which molded articles are obtained which can very easily be removed from the mold and which have a very good quality of the surface.

---

This application is a continuation application of pending application Ser. No. 51,742 filed July 1, 1970, and now abandoned.

The present invention relates to thermoplastic molding compositions based on saturated polyesters.

It has been proposed to work up polyesters from aromatic dicarboxylic acids and aliphatic or cycloaliphatic diols into crystallized molded articles by injection-molding. The polyester derived from terephthalic acid and ethylene glycol is especially important from a technical point of view. However, certain requirements have to be fulfilled to obtain a technically valuable molding composition from the polyester raw material which is used as the basic material for the injection-molding material. For example, the polyester must readily crystallize in the mold to ensure the great hardness, dimensional stability and stability in the mold which are characteristic for this material. Moreover, the injection-molding machine must operate automatically, i.e. the molded articles must fall from the mold without manual aid. These requirements can partially be fulfilled by approximation by adjusting the machine accordingly. For example, heating the mold greatly accelerates the speed of crystallization. However, heating the mold promotes sticking of the molded polyester articles which are still in the non-rigid state, that is to say it is not sufficient to adjust the machine in order to obtain satisfactory molded articles. It is the polyester raw material that has to be modified by additives in a suitable manner.

Thus it has been described in British patent specification 1,104,089 to admix divided, solid inorganic substances to the polyethylene terephthalate to increase the speed of crystallization. However, crystallization auxiliaries do not at the same time promote the easy release of the molded articles from the mold. It is, therefore, an important problem to overcome the unsatisfactory removability from the mold of molded pieces derived from thermoplastic polyesters.

Now we have found that a thermoplastic molding composition comprising (a) a linear saturated polyeter of an aromatic dicarboxylic acid which, optionally, may contain an amount of up to 10% by weight of an aliphatic dicarboxylic acid, with a saturated aliphatic or cycloaliphatic diol, (b) 0.05% to 2% by weight, preferably 0.1% to 0.5% by weight, calculated on the polyester, of an inert, inorganic solid material having a particle size of less than 5 microns, (c) 0.02% to 8% by weight, preferably, 0.05% to 1% by weight, calculated on the polyester, of an alkali metal paraffin monosulfonate which may contain from its preparation up to 0.5% by weight of an alkali metal paraffin disulfonate, and which contains 8 to 30 carbon atoms, preferably 10 to 18 carbon atoms in the chain, the sulfonate groups being bound to any of the carbon atoms of the carbon chain, or 0.02% to 8% by weight, preferably 0.05% to 1% by weight, calculated on the polyester, of an alkali metal olefin sulfonate which contains 8 to 30 carbon atoms, preferably 15 to 18 carbon atoms in the chain, the alkali metal sulfonate group being bound to the terminal olefinic carbon atom according to the formula

$$R\text{—}CH=CH\text{—}SO_3Me$$

possesses excellent properties as injection-molding material.

The alkali metal paraffin sulfonates or the alkali metal olefin sulfonates are excellent mold lubricants for molded articles based on thermoplastic polyesters. With the use of these mold lubricants even complicated molded articles fall from the mold automatically even with short residence times in the mold, which fact has great influence on the economy of the process. Also the surface quality of the molded articles obtained is especially high. It is of special importance that these mold lubricants are chemically inert and neither promote the degradation of the polyester material nor cause any discoloration of the molded articles.

In the process of the invention, polyethylene terephthalate is preferably used as the linear polyester. However, other polyesters, for example, poly-cyclohexane-(1,4)-dimethylol terephthalate may also be used. It is also possible to use modified polyethylene terephthalates which contain, in addition to terephthalic acid, other aromatic or aliphatic dicarboxylic acids as structural units, for example, isophthalic acid, naphthalene-(1,6)-dicarboxylic acid or adipic acid. Furthermore, there may be used modified polyethylene terephthalates which contain, in addition to ethylene glycol, other aliphatic diols such, for example, as neopentyl glycol or butanediol-(1,4) as the alcoholic component. Polyesters from hydroxycarboxylic acids may also be used. The polyesters should generally have a reduced specific viscosity within the range of from 0.9 to 1.6 dl./g. (measured in a 1% solution in a 60:40 by weight mixture of phenol and tetrachloroethane at 25° C.). Polyesters having a reduced specific viscosity within the range of from 1.1 to 1.5 dl./g. may be used with special advantage.

As inorganic inert solid materials there may be used, for example, silicates such as glass powder, talcum and kaolin, metal oxides such as magnesium oxide, antimony trioxide, titanium dioxide, aluminum oxide, calcium carbonate having a particle size below 5 microns.

As alkali metal paraffin sulfonate there may be used, for example, sodium sulfonates of unbranched or branched paraffins containing 8 to 30, preferably 10 to 18 carbon atoms. One or two of the sodium sulfonate groups may be bound to any of the carbon atoms of the carbon chain.

As alkali metal olefin sulfonates there may be used sodium sulfonates of α-olefins in which a sodium sulfonate group is bound to the carbon atom of the terminal double bond, R—CH=CH—SO₃Na. As radicals R there enter into consideration saturated, unbranched or branched aralkyl- and alkyl radicals containing 6 to 28 carbon atoms, preferably 8 to 16 carbon atoms. In addition to sodium sulfonates, there may be used lithium- or potassium sulfonates.

Different methods may be applied for the preparation of the molding composition of the invention. The alkali metal paraffin sulfonates or the alkali metal olefin sulfonates may be added at the beginning of the esterification or the ester interchange reaction or at any time of the polycondensation. However, it is also possible to subject the finished polyester granules to rotation together with the alkali metal paraffin- or olefin sulfonates which are then incorporated into the polyester by melting in an extruder and by subsequent granulation. A third possibility consists in simply coating the polyester granules with the alkali metal sulfonates in a drum prior to injection-molding.

It is possible to add the crystallization auxiliary in the same manner and simultaneously with the alkali metal sulfonate. However, it may also be incorporated separately into the polyester at another time or in an own process step, or the polyester granules may be coated with the crystallization auxiliary by rolling in a drum.

The general working direction is that all operations should be carried out with the exclusion of moisture to prevent the degradation of the polyester. The polyester masses shall preferably contain less than 0.01% by weight of water. When a rapid crystallization in the mold is to be attained, it is necessary to maintain the mold at a temperature of at least 100° C. It is most advantageous to operate with temperatures in the mold lying within the range of from 120° to 150° C.

The following examples serve to illustrate the invention, the parts and percentages being by weight:

EXAMPLE 1

(1) The temperature of a mixture comprising 1000 parts dimethyl terephthalate, 800 parts ethylene glycol and 0.31 part manganese acetate was gradually raised to 225° C., with agitation, while methanol was distilled off over a column until the ester interchange reaction was terminated. By increasing the temperature to 270° C., the excess amount of ethylene glycol was expelled. After the addition of 2 parts of sodium paraffin sulfonate ($C_{13}$–$C_{18}$) which contained 0.01% of disulfonate, 4 parts of talcum and 0.0348 part of germanium phosphite, the polycondensation was carried out under a final pressure of 0.1 mm. of mercury while raising the temperature to 275° C. This operation had to be carried out while controlling the batch continuously because of the danger of foaming over. The finished polyester was to have a relative specific viscosity of 0.8 to 0.9 dl./g. After the discharge from the kettle, the polyester strand was granulated and the granular product so obtained was condensed in the solid phase at 235° C. under a pressure of 0.1 to 0.2 mm. of mercury until it had a reduced specific viscosity (RSV) of 1.45 dl./g.

(2) The polyester molding composition so obtained was injection-molded into 100 sheets of dimensions 60 x 60 x 2 mm. and into 100 gears (diameter of root circle 104 mm., diameter of top circle 114 mm., pitch 54, tooth thickness 5 mm.). The injection conditions were: temperature of the cylinder 270°/260°/260° C.; temperature of the mold 140° C.; injection time 15 seconds, injection pressure 140 atmospheres gauge. The residence time in the mold was varied in the case of the sheets to 5 to 25 seconds and in the case of the gears to 20 to 60 seconds. It was found that with short residence times in the mold more than 90% of the molded articles fell from the mold and had an excellent surface gloss. Moreover, the molded articles had no ejector pin marks.

EXAMPLE 2

(1) The ester interchange reaction was carried out in a manner analogous to that of Example 1. After the interchange of ester radicals was complete, 4 parts of talcum were stirred into the reaction mixture and the polycondensation was carried out. Since the melt did not contain any sulfonate, the increase of the temperature and the decrease of the pressure could be accomplished rapidly. After the discharge, the polyester mass was granulated and the condensation in the solid phase carried out until a RSV of 1,430 was attained.

(2) The polyester granules so obtained were subjected to rotation in a drum with 2 parts of sodium paraffin sulfonate for a period of 2 hours, with the exclusion of air and moisture. The prerequisite for a good efficacy of the paraffin sulfonate is its uniform distribution on the granular polyester product. For this reason, the paraffin sulfonate having a water content of less than 0.01% was finely ground prior to its use. The molding composition obtained in this manner was injection-molded into sheets or gears under the same conditions as those described in Example 1(2). It was found that the removability from the mold and the sheet quality of the molded articles obtained practically did not differ from those of the test in which the paraffin sulfonate had been incorporated into the melt.

(3) The polyester material obtained according to Example 2(1) was subjected to rotation with 2 parts of sodium olefin sulfonate ($C_{15}$ to $C_{18}$). The sodium olefin sulfonate had previously been carefully dried and ground. After the polyester granules had been coated, the molding composition was injection-molded into sheets or gears under the conditions as described in Example 1(2). Also in this case the molded pieces had an excellent surface gloss and no ejector pin marks. The tabularized measurements show that the sodium sulfonates added in no case brought about a higher reduction of the RSV value than when working according to control test 2(4).

(4) As a control experiment, the polyester molding composition prepared in the manner as described under Example 2(1), to which had been added 4 parts of talcum, was injection-molded into sheets and gears *without* the addition of a mold lubricant. The charge was subjected to the same injection conditions as those used in the other tests. However, in order to obtain fairly satisfactory molded pieces, the residence times in the mold had to be increased considerably. Nevertheless, the proportion of the molded pieces which fell automatically from the mold was substantially lower and their surfaces showed deep marks of the ejector pins owing to strong sticking to the walls of the mold.

EXAMPLE 3

(1) First a polyethylene terephthalate having a RSV of 1,450 dl./g. was prepared in a manner analogous to that described in Example 1(1), however, without the addition of a crystallization auxiliary and a mold lubricant.

(2) This polyester raw material was coated simultaneously with 4 parts of calcium carbonate and 2 parts of sodium olefin sulfonate by rolling in a drum. To ensure an optimum efficacy, both additives were dried and ground carefully. This molding composition was injection-molded in two different molds in the manner as described under Example 1(2). When using this method, good results were obtained with regard to the removability from the mold and the quality of the molded pieces.

EXAMPLE 4

(1) In the manner as described in Example 1(1), a polyester molding composition was prepared which contained 2 parts of sodium paraffin sulfonate which were stirred into the melt after the ester interchange reaction. After the condensation in the solid phase, the RSV value of the granular product amounted to 1,460 dl./g.

(2) The polyester mass obtained in this manner was subjected to rotation for 2 hours with 4 parts of a commercial calcium-magnesium-aluminum silicate having the following composition. 32.27% of $SiO_2$, 18.43% of CaO, 17.42% of MgO, 9.11% of Al$_2$O$_3$, 1.24% of Na$_2$O, loss at red heat 20.05%, as a crystallization auxiliary, with the exclusion of air and moisture. The mass was then injection-molded into sheets and gears in the manner as described in Example 1(2). The tables following hereunder indicate the number of the molded pieces which fell from the mold as well as their surface quality.

(3) The polyester mass prepared according to Example 4(1) was subjected to rotation with 4 parts of finely ground pyrophyllite as the crystallization auxiliary and another 2 parts of sodium olefin sulfonate (C$_{15}$–C$_{18}$), and the mass was then injection-molded into sheets and gears. The tables show that the results of injection-molding as compared with those obtained according to Example 4(2) could be improved by the renewed addition of a sodium sulfonate.

olefin sulfonate which contains 8 to 30 carbon atoms, the alkali metal sulfonate group being bound to the terminal olefinic carbon atom according to the formula R—CH=CH—SO$_3$Me.

2. A thermoplastic molding composition as claimed in claim 1, wherein the linear saturated polyester is polyethylene glycol terephthalate.

3. A thermoplastic molding composition as claimed in claim 1, wherein the linear saturated polyester is polycyclo-hexane-1,4-dimethylol terephthalate.

4. A thermoplastic molding composition as claimed in claim 1, wherein the linear saturated polyester has a reduced specific viscosity within the range of from 0.9 to 1.6 dl./g. (measured in a 1% solution in a 60:40 by weight mixture of phenol and tetrachloroethane at 25° C.).

| Example | Type of PET molding composition Mold lubricant (parts) | Crystallization auxiliary (parts) | Molded articles | RSV[1] (dl./g.) Granules prior to inj. mold. | RSV[1] (dl./g.) Molded article | Residence time in the mold (sec.) | Removability from the mold; of 100 molded articles, respectively, there fall from the mold |
|---|---|---|---|---|---|---|---|
| 1 | 2 parts sodium paraffin sulfonate (melt) | 4 parts talcum (melt) | Sheets | 1,450 | 1,305 | 5 / 15 / 25 | 93 / 100 / 100 |
|  |  |  | Gears |  | 1,290 | 20 / 40 / 60 | 95 / 100 / 100 |
| 2(2) | 2 parts sodium paraffin sulfonate (applied by rolling in a drum). | 4 parts talcum (melt) | Sheets | 1,430 | 1,280 | 5 / 15 / 25 | 92 / 100 / 100 |
|  |  |  | Gears |  | 1,270 | 20 / 40 / 60 | 95 / 100 / 100 |
| 2(3) | 2 parts sodium olefin sulfonate (applied by rolling in a drum). | 4 parts talcum (melt) | Sheets | 1,430 | 1,300 | 5 / 15 / 25 | 93 / 100 / 100 |
|  |  |  | Gears |  | 1,260 | 9 / 20 / 40 / 60 | 94 / 100 / 100 |
| 2(4) | Without sulfonate | 4 parts talcum (melt) | Sheets | 1,430 | 1,280 | 20 / 30 / 60 | 55 / 61 / 74 |
|  |  |  | Gears |  | 1,260 | 60 / 80 / 120 | 54 / 68 / 81 |
| 3 | 2 parts sodium olefin sulfonate (applied by rolling in a drum). | 4 parts CaCO$_3$ (applied by rolling in a drum). | Sheets | 1,450 | 2,295 | 5 / 15 / 25 | 90 / 95 / 100 |
|  |  |  | Gears |  | 1,270 | 20 / 40 / 60 | 91 / 96 / 100 |
| 4(2) | 2 parts sodium paraffin sulfonate (melt) | 4 parts Mikro Velva A® (applied by rolling in a drum). | Sheets | 1,460 | 1,310 | 5 / 15 / 25 | 95 / 96 / 100 |
|  |  |  | Gears |  | 1,300 | 20 / 40 / 60 | 96 / 98 / 100 |
| 4(3) | 2 parts sodium paraffin sulfonate (melt) plus 2 parts sodium olefin sulfonate (applied by rolling in a drum). | 4 parts pyrophyllite (applied by rolling in a drum). | Sheets | 1,460 | 1,290 | 5 / 15 / 20 | 100 / 100 / 100 |
|  |  |  | Gears |  | 1,270 | 20 / 40 / 60 | 100 / 100 / 100 |

[1] Reduced specific viscosity.

What is claimed is:
1. A thermoplastic molding composition comprising
    (a) a linear saturated polyester of an aromatic dicarboxylic acid which, optionally, may contain an amount of up to 10% by weight of an aliphatic dicarboxylic acid, with a saturated aliphatic or cycloaliphatic diol, and
    (b) 0.05% to 2% by weight, calculated on the polyester, of an inert, inorganic solid material having a particle size of less than 5 microns, and
    (c) 0.02% to 8% by weight, calculated on the polyester, of an alkali metal paraffin monosulfonate which may contain up to 0.5% by weight of an alkali metal paraffin disulfonate, which contains 8 to 30 carbon atoms in the chain, or 0.02% to 8% by weight, calculated on the polyester, of an alkali metal

5. A thermoplastic molding composition as claimed in claim 1, which contains as the alkali metal paraffin sulfonate a sodium sulfonate of a straight-chained or branched paraffin containing 8 to 30 carbon atoms.

6. A thermoplastic molding composition as claimed in claim 1, which contains as the alkali metal paraffin sulfonate a sodium sulfonate of an unbranched or branched paraffin containing 10 to 18 carbon atoms.

7. A thermoplastic molding composition as claimed in claim 1, which contains as the alkali metal olefin sulfonate a sodium sulfonate of an α-olefin in which a sodium sulfonate group is bound to the carbon atom of the terminal double bond.

8. A thermoplastic molding composition as claimed in claim 1, wherein a sodium sulfonate of an α-olefin containing 10 to 18 carbon atoms is used as the alkali metal olefin sulfonate.

9. A molded article obtained from a thermoplastic molding composition as claimed in claim 1.

References Cited

UNITED STATES PATENTS

| | | | |
|---|---|---|---|
| 2,921,048 | 1/1960 | Bell et al. | 260—45.9 |
| 2,978,440 | 4/1961 | Frissell et al. | 260—87.1 |
| 3,299,006 | 1/1967 | Tomiyama et al. | 260—75 |
| 3,516,957 | 6/1970 | Gray et al. | 260—22 |

FOREIGN PATENTS

| | | |
|---|---|---|
| 1,047,374 | 4/1960 | Germany. |
| 1,104,089 | 2/1968 | Great Britain. |
| 1,526,402 | 5/1968 | France. |
| 1,215,925 | 5/1966 | Germany. |
| 1,234,020 | 2/1967 | Germany. |

OTHER REFERENCES

Encycl. Polym. Sci. & Technol. 2, 212, 222 (1965).

Encycl. Polym. Sci. & Technol. 8, 335 (1968).

McAteer et al., Chem. Phys. Appl. Appl. Surface Active Subst., Proc. Int. Congr., 4th, 1964, 1, 127–40 (1967) (abstr. supplied).

MELVIN GOLDSTEIN, Primary Examiner

U.S. Cl. X.R.

260—75 T; 264—328